US008901331B2

(12) United States Patent
Van der Waal et al.

(10) Patent No.: US 8,901,331 B2
(45) Date of Patent: Dec. 2, 2014

(54) PROCESS FOR REFINING A TRIGLYCERIDE OIL

(75) Inventors: Patrick Van der Waal, AZ Wormerveer (NL); Krishnadath Bhaggan, AZ Wormerveer (NL); Ulrike Schmid, AZ Wormerveer (NL)

(73) Assignee: Stepan Specialty Products, LLC, Wilmington, DE (US)

( * ) Notice: Subject to any disclaimer, the term of this patent is extended or adjusted under 35 U.S.C. 154(b) by 904 days.

(21) Appl. No.: 12/921,835

(22) PCT Filed: Mar. 13, 2009

(86) PCT No.: PCT/EP2009/001863
§ 371 (c)(1),
(2), (4) Date: Dec. 13, 2010

(87) PCT Pub. No.: WO2009/115248
PCT Pub. Date: Sep. 24, 2009

(65) Prior Publication Data
US 2011/0124897 A1 May 26, 2011

(30) Foreign Application Priority Data
Mar. 17, 2008 (EP) .................................... 08250903

(51) Int. Cl.
| C11B 3/00 | (2006.01) |
| C11B 5/00 | (2006.01) |
| C11B 3/10 | (2006.01) |
| A23D 9/02 | (2006.01) |
| A23D 9/007 | (2006.01) |

(52) U.S. Cl.
CPC ................. *C11B 3/10* (2013.01); *C11B 5/0092* (2013.01); *A23D 9/02* (2013.01); *C11B 3/001* (2013.01); *C11B 3/008* (2013.01); *A23D 9/007* (2013.01)
USPC .......................................... 554/175; 554/230

(58) Field of Classification Search
USPC ................................................... 554/175, 230
See application file for complete search history.

(56) References Cited

U.S. PATENT DOCUMENTS

| 1,982,907 A | 12/1934 | Eckcy |
| 3,522,145 A | 7/1970 | Apostolatos et al. |
| 4,325,883 A | 4/1982 | Jones et al. |
| 5,023,100 A | 6/1991 | Chang et al. |
| 5,288,619 A | 2/1994 | Brown et al. |
| 6,159,523 A | 12/2000 | Cain et al. |
| 6,590,113 B1 | 7/2003 | Sleeter |
| 6,623,774 B2 | 9/2003 | Kendrick et al. |
| 2003/0161918 A1 | 8/2003 | Kendrick et al. |
| 2004/0059142 A1 | 3/2004 | Bijl et al. |
| 2007/0003686 A1* | 1/2007 | Fichtali et al. ............... 426/601 |
| 2007/0116843 A1 | 5/2007 | Changaris |
| 2007/0141222 A1 | 6/2007 | Binder et al. |

FOREIGN PATENT DOCUMENTS

| CA | 2 288 528 A1 | 5/2000 |
| CA | 2288528 A1 * | 5/2000 |
| CN | 1814721 | 8/2006 |
| EP | 0 340 635 A2 | 11/1989 |
| EP | 0340635 A * | 11/1989 |
| EP | 0 771 531 A2 | 5/1997 |
| EP | 0999259 A1 | 5/2000 |
| EP | 1 088 552 A1 | 4/2001 |
| EP | 1 178 103 A1 | 2/2002 |
| GB | 558922 | 1/1944 |
| GB | 1532662 A | 11/1978 |
| GB | 2241503 A | 9/1991 |
| JP | 61-058536 | 3/1986 |
| JP | 2000-144168 | 5/2000 |
| WO | WO 01/98445 A1 | 12/2001 |
| WO | WO 02/10322 A1 | 2/2002 |
| WO | WO0210322 A * | 2/2002 |
| WO | WO 2008/138575 A2 | 11/2008 |

OTHER PUBLICATIONS

Notification Concerning Transmittal of International Preliminary Report on Patentability from counterpart International Application No. PCT/EP2009/001863, dated Sep. 30, 2010.
Notification of Transmittal of the International Search Report and the Written Opinion on the International Searching Authority for Int'l Application No. PCT/EP2009/001863, Date Mailed: Jul. 6, 2009.
Office Action issued in application No. JP 2011-500087 (Aug. 20, 2013).
Office Action issued in Chinese App. No. 201180013007.1 (Apr. 23, 2014).

* cited by examiner

*Primary Examiner* — Deborah D Carr
(74) *Attorney, Agent, or Firm* — Barnes & Thornburg LLP; Brian R. Dorn

(57) ABSTRACT

A process for refining a triglyceride oil comprises: —providing a triglyceride oil; —bleaching the oil in the presence of an added antioxidant in a first bleaching step; —bleaching the oil in a second bleaching step; and —deodorizing the bleached oil, wherein the antioxidant comprises a rosemary extract.

20 Claims, No Drawings

PROCESS FOR REFINING A TRIGLYCERIDE OIL

This application is the U.S. National Stage of International Application No. PCT/EP2009/001863, filed Mar. 13, 2009, which designates the U.S., published in English, and claims priority under 35 U.S.C. §§119 or 365(c) to European Application No. 08250903.5, filed Mar. 17, 2008.

This invention relates to a process for refining a triglyceride oil.

Triglyceride oils have a glycerol backbone bonded to three acyl groups. They may be prepared synthetically or may be derived from natural products. In natural products, the acyl groups are often a mixture of different fatty acid residues. Some of the triglyceride oils that are naturally occurring are valuable commercial products. For example, triglyceride oils derived from palm are used extensively in the food industry. Triglyceride oils from fish are used in health supplements. Typically, the oils will be refined compared to the naturally occurring, crude oils before they are used in the final product. Refining often involves neutralising the oil, bleaching and deodorising. Since unsaturated oils tend to be relatively unstable with respect to oxidation in air, an antioxidant is often added to the deodorised oil.

U.S. Pat. No. 1,982,907 relates to a process for stabilising the flavour and odour of fatty materials. The process involves treating the fatty material simultaneously with a powdered solid and an acid antioxidant, such as phosphoric acid and kieselguhr. The process is stated as being carried out before, during or after deodorization and before or after bleaching, with a strong preference for treating the oil with the powdered solid and acid antioxidant after deodorising.

EP-A-1178103 describes the purification of crude PUFA oils. The purification process may involve the optional steps of treatment with alkali (neutralisation) and bleaching prior to deodorising and the document is concerned with the blend of ω6 and ω3 oils that is used at the start of the process, rather than any particular process technique.

EP-A-771531 relates to blends of sesame oil with other, bulk oils, in order to stabilise the bulk oil during frying.

U.S. Pat. No. 6,159,523 describes a composition based on fish oil that is obtained by the treatment of fish oil with a lipase enzyme.

U.S. Pat. No. 4,325,883 discloses a process for bleaching a naturally occurring oil or fat. The colour of the bleached product may be determined using a Lovibond tintometer.

EP-A-0340635 describes the purification of fish oil. An oil containing EPA and DHA is subjected to vacuum steam distillation followed by contacting with an adsorbent.

US 2007/0003686 discloses a polyunsaturated fatty acid-containing oil product and its uses and production. The product is a solid fat composition comprising a saturated fat and a microbial oil.

GB 558922 relates to the refining of vitamin-containing fish oils. The oils are treated with an adsorbent in the presence of a small amount of a natural vegetable antioxidant concentrate.

WO 02/10322 discloses the purification of crude polyunsaturated oils. The addition of antioxidants and bleaching are both optional steps and, in the examples, an antioxidant is not present during a bleaching step.

There remains a need for processes for refining triglyceride oils that have one or more advantages such as reduced colour in the refined oil, greater stability of the refined oil against oxidation, better performance of antioxidant and/or the capability of using lower amounts of antioxidant.

Surprisingly, a process has now been found which achieves a better colour and a superior antioxidant effect in the refined oil.

According to the present invention, there is provided a process for refining a triglyceride oil which comprises:
  providing a triglyceride oil;
  bleaching the oil in the presence of an added antioxidant in a first bleaching step;
  bleaching the oil in a second bleaching step; and
  deodorizing the bleached oil,
wherein the antioxidant comprises a rosemary extract.

In another aspect, the invention provides a method of increasing the efficacy of an antioxidant in a process for refining a triglyceride oil which comprises adding the antioxidant to the oil in the first stage of a multi-stage (e.g., two stage) bleaching process.

In a further aspect, the invention provides a process for reducing the colour of a refined triglyceride oil which comprises:
  providing a triglyceride oil;
  bleaching the oil in the presence of an added antioxidant in a first bleaching step;
  bleaching the oil in a second bleaching step; and
  deodorizing the bleached oil,
wherein the antioxidant comprises a rosemary extract.

The colour of the oil is reduced compared to the oil produced by a corresponding process in which the antioxidant is added after the deodorizing step and not in the first bleaching step.

Also provided by the invention in another aspect is a method of increasing the storage stability of a triglyceride oil which comprises:
  providing a triglyceride oil;
  bleaching the oil in the presence of an added antioxidant in a first bleaching step;
  bleaching the oil in a second bleaching step; and
  deodorizing the bleached oil,
wherein the antioxidant comprises a rosemary extract.

A further aspect of the invention is a refined oil produced by the process of the invention.

The invention is at least partly based on the surprising finding of a process that improves the efficiency of an added antioxidant and thus increases the resistance to oxidation of a triglyceride oil for a given amount of antioxidant. The invention also involves the finding that an oil refined according to the invention has a better (i.e:, lower) colour.

The starting material for the process of the invention is a triglyceride oil. The starting material is typically unrefined and may, for example, be a crude oil or a concentrate obtained from a crude oil. The triglyceride oil that is used at the start of the process will generally not have been neutralised. The triglyceride oil that is used at the start of the process has preferably not been subject to bleaching. Usually, the triglyceride oil that is used at the start of the process will not have been subjected to deodorisation.

The triglyceride oil may be a fat or oil (the term "triglyceride oil" is intended to cover both fats and oils) and typically comprises at least 50% by weight triglycerides, more preferably at least 70% by weight triglycerides, even more preferably at least 75% by weight triglycerides, such as at least 80%, at least 85%, at least 90% or at least 95% by weight triglycerides. Preferably, the triglycerides comprise fatty acid residues. The term "fatty acid" as used herein is intended to include straight chain, saturated or unsaturated (including mono- and poly- (i.e., di- and higher) unsaturated) alkyl carboxylic acids having from 12 to 24 carbon atoms.

Preferably, the triglyceride oil is a polyunsaturated oil. Thus, the triglyceride oil preferably comprises fatty acid acyl groups in which the fatty acid acyl group is polyunsaturated i.e., has two or more unsaturated carbon-carbon double bonds. Other fatty acid acyl groups will usually also be present. Typically, more than 10% by weight of the fatty acid acyl groups in the triglyceride oil will be unsaturated, more preferably at least 25% by weight of the fatty acid acyl groups in the triglyceride oil will be unsaturated, even more preferably at least 40% by weight of the fatty acid acyl groups in the triglyceride oil will be unsaturated, for example at least 45%, at least 50%, at least 55% or at least 60% by weight of the fatty acid acyl groups in the triglyceride oil may be unsaturated.

The triglyceride oil preferably comprises tri-unsaturated fatty acid acyl residues in an amount of from 1 to 40% by weight, more preferably from 5 to 30% by weight, such as from 10 to 20% by weight (based on the weight of fatty acid carboxylic acids in the oil).

Preferably, the oil comprises acyl groups of pinolenic acid. The pinolenic acid content of the triglyceride oil (based on the weight of fatty acid carboxylic acids in the oil) is preferably from 1 to 40% by weight, more preferably from 5 to 30% by weight, such as from 10 to 20% by weight.

The triglyceride oil is preferably pine nut oil or a fraction or concentrate derived from pine nut oil. Concentrates of pine nut oil are disclosed in EP-A-1088552, for example.

Prior to bleaching in the process of the invention, the oil may be treated, for example with alkali to reduce the acid content of the oil. This step is known in the art as neutralisation and suitable conditions for effecting this step will be known to those skilled in the art. Typically, the oil is treated with sodium or potassium hydroxide at an elevated temperature. For example, the oil may be treated with an aqueous solution of sodium or potassium hydroxide at a temperature of from 30 to 100° C., more preferably from 90 to 98° C.

The process of the invention comprises a first step of bleaching the oil in the presence of an added antioxidant. The term "added antioxidant" is intended to mean that an antioxidant is added to the oil and does not include any antioxidant compounds that are already naturally present in the oil. Preferred antioxidants include tocopherols and extracts from natural products (such as from rosemary or oregano). Thus, extracts from natural products other than rosemary, such as from oregano, may be used to replace the rosemary extracts in the invention.

The antioxidant is preferably used at a level of from 0.1 to 1% by weight of the oil.

Preferred antioxidants comprise rosemary extract, tocopherols and mixtures thereof. More preferably, the antioxidant comprises a mixture of a rosemary extract and one or more tocopherols. The weight ratio of rosemary extract to one or more tocopherols is preferably in the range of from 3:1 to 1:1.

Thus, in one preferred aspect, the invention provides a process for refining a triglyceride oil which comprises:
  providing a triglyceride oil;
  bleaching the oil in the presence of an added antioxidant in a first bleaching step;
  bleaching the oil in a second bleaching step; and
  deodorizing the bleached oil,
wherein the oil comprises acyl groups of pinolenic acid and the antioxidant comprises a rosemary extract, optionally as a mixture together with one or more tocopherols.

The first and second bleaching steps are preferably carried out at an elevated temperature, for example at from 50 to 150° C., more preferably from 80 to 120° C., such as from 90 to 105° C. The first and second bleaching steps may be carried out at the same temperature or different temperatures. During bleaching, at least a proportion of the compounds that are responsible for the colour of the oil are removed, typically by degradation or absorption onto a material such as a bleaching earth.

The first and/or second bleaching steps are optionally carried out with an initial treatment of the oil with citric acid, for example in an amount of from 0.001 to 0.1% (more preferably from 0.01 to 0.05%) by weight of the oil, optionally followed by the addition of water, for example in an amount of from 0.05 to 1% by weight of the oil.

The first and second bleaching steps are preferably carried out in the presence of one or more added absorbents. Suitable absorbents include bleaching earths and activated carbon and mixtures thereof.

Bleaching earths are absorbent materials that are capable of removing colour from the oil. Suitable bleaching earths include mineral absorbents such as clays and celite. Tonsil 215FF™ is a preferred material for this purpose.

Preferably, the first bleaching step is carried out in the presence of activated carbon. Activated carbon may help to absorb contaminants. Activated carbon is available under the trade mark Norit™. The second bleaching step is preferably carried out in the absence of activated carbon.

The oil is preferably filtered between the first and second bleaching steps, for example using a filter having a pore size of less than 20 more preferably less than 15 µm. This filtration step is carried out to remove at least a proportion of the absorbent materials that are used in the first bleaching step before the second bleaching step is carried out.

After the second bleaching step, the oil is preferably filtered through a filter having a pore size of less than 10 µm, more preferably less than 5 µm, prior to deodorisation.

After the first and second bleaching steps, the oil is deodorised. Deodorisation is carried out to remove at least a proportion of the more volatile compounds that may impart an odour to the oil. Deodorisation is preferably carried out at an elevated temperature in the range of from 120 to 250° C., more preferably from 130 to 240° C. Typically, deodorisation is performed for a time of from 1 to 10 hours, such as from 2 to 6 hours.

The process of the invention may comprise one or more further steps before, during or after the bleaching and deodorising steps. However, it is preferred that deodorising directly follows bleaching. It is also preferred that the second bleaching step directly follows the first bleaching step. Preferably the process of the invention does not comprise the step of distilling the oil to obtain the triglyceride oil as a distillate.

The process of the invention improves the resistance of the refined oil to oxidation. Preferably, further antioxidant is not added to the deodorized oil, although further antioxidant may be added if an even greater resistance to oxidation is desired.

It has been found that the process of the invention may unexpectedly improve the colour of the oil. Preferably, the oil has a colour R (5¼") of less than 3, more preferably less than 2.5, such as from 1.5 to 2.2. The R (5¼") value can be determined according to AOCS Cc 13e-92, Color, 2000.

The process of the invention may provide a deodorized oil having a peroxide value after 3 weeks in air at 40° C. of less than 3 meqO$_2$/kg, more preferably less than 2, even more preferably less than 1 meqO$_2$/kg. Peroxide value can be determined according to AOCS; Cd 8b-90; Peroxide value; 1997.

The listing or discussion of an apparently prior-published document in this specification should not necessarily be taken as an acknowledgement that the document is part of the state of the art or is common general knowledge.

The following non-limiting examples illustrate the invention and do not limit its scope in any way. In the examples and throughout this specification, all percentages, parts and ratios are by weight unless indicated otherwise.

EXAMPLES

The following materials were used in the examples:

| | | Supplier |
|---|---|---|
| Tonsil 215FF | bleaching earth | Süd Chemie AG |
| Norit | activated carbon | Norit NL BV |
| Hyflo | celite | Harbolide, France |
| Herbalox HT-O | Rosemary extract | Kalsec UK Ltd |
| Tocoblend L50 IP | tocopherols | Vitablend BV |

Example 1 (Comparative Example)

5 kg of crude pine nut oil having a free fatty acid content (FFA) of 1.47% was refined according to the following process.

The oil was neutralized at 95° C. with 0.8N NaOH (23 g NaOH (50%) and 347 g demineralised water). The oil was washed until soap free (final washing with citric acid solution). The FFA content of the neutralized oil was 0.69%.

The neutralised oil was then subjected to a first bleaching step at 95° C. The oil was treated with 0.1% citric acid ((30%), 5 g) and stirred for 15 minutes, then 0.2% (10 g) demineralised water was added and the mixture was stirred for 15 minutes. Afterwards, 1.0% Tonsil 215FF bleaching earth (50 g), 0.25% Norit (12.5 g) and 0.7% Hyflo (35 g) were added to the mixture and the resultant mixture was stirred for 15 minutes. The steps were carried out at atmospheric pressure.

The pressure of the resulting oil was brought to 100 mbar over 10 minutes and the oil was then bleached at this pressure for 20 minutes.

The oil was then filtered into a jerry-can via a 10 μm (micron) filter and, after rinsing the reactor, put back into the vessel for the next step.

A second bleaching step was then carried out without Norit. The oil was treated with 0.1% citric acid (30%, 5 g) and stirred for 15 minutes, then 0.2% (10 g) demineralised water was added and the mixture was stirred for 15 minutes. Afterwards, 1.0% Tonsil 215FF (50 g) and 0.7% Hyflo (35 g) were added to the mixture and the resultant mixture was stirred for 15 minutes. The steps were carried out at atmospheric pressure.

The pressure of the resulting oil was brought to 100 mbar over 10 minutes and the oil was then bleached at this pressure for 20 minutes.

After this, the bleached product was filtered (via 1 μm filter) into the deodorizer. Samples were taken.

The oil was then deodorized at 220° C. for 4 hours. After this, it was cooled down to 50° C. (at 120° C., 0.005% citric acid (30% wt) was added).

0.25% rosemary extract (12.5 g Herbalox HT-O) and 0.20% Tocoblend L50 IP (10.0 g) were added to the product and the resulting product was tapped into a jerry-can via a 1 μm filter, under nitrogen.

Example 2

5 kg of crude pine nut oil having a free fatty acid content (FFA) of 1.1% was refined according to the following process.

The oil was neutralized at 95° C. with 0.8N NaOH (16 g NaOH (50%) and 236 g demineralised water). The oil was washed until soap free (final washing with citric acid solution). The FFA content of the neutralized oil was 0.47%.

To the neutralized oil was added 0.25% rosemary extract (12.5 g Herbalox HT-O) and 0.20% Tocoblend L50 IP (10.0 g).

The neutralised oil was then subjected to a first bleaching step at 95° C. The oil was treated with 0.1% citric acid ((30%), 5 g) and stirred for 15 minutes, then 0.2% (10 g) demineralised water was added and the mixture was stirred for 15 minutes. Afterwards, 1.0% Tonsil 215FF bleaching earth (50 g), 0.25% Norit (12.5 g) and 0.7% Hyflo (35 g) were added to the mixture and the resultant mixture was stirred for 15 minutes. The steps were carried out at atmospheric pressure.

The pressure of the resulting oil was brought to 100 mbar over 10 minutes and the oil was then bleached at this pressure for 20 minutes.

The oil was then filtered into a jerry-can via a 10 μm (micron) filter and, after rinsing the reactor, put back into the vessel for the next step.

A second bleaching step was then carried out without Norit. The oil was treated with 0.1% citric acid (30%, 4.1 g) and stirred for 15 minutes, then 0.2% (8.2 g) demineralised water was added and the mixture was stirred for 15 minutes. Afterwards, 1.0% Tonsil 215FF (41 g) and 0.7% Hyflo (29 g) were added to the mixture and the resultant mixture was stirred for 15 minutes. The steps were carried out at atmospheric pressure.

The pressure of the resulting oil was brought to 100 mbar over 10 minutes and the oil was then bleached at this pressure for 20 minutes.

After this, the bleached product was filtered (via 1 μm filter) into the deodorizer. Samples were taken.

The oil was then deodorized at 220° C. for 4 hours. After this, it was cooled down to 50° C. (at 120° C., 0.005% citric acid (30% wt) was added). The resulting product was tapped into a jerry-can via a 1 μm filter, under nitrogen.

Example 3

The refined oils of Examples 1 and 2 and a crude pine nut oil were analysed for fatty acid content by GC-FAME and for their colour in a 5¼" cell according to AOCS Cc 13e-92, Color, 20.

Results:

| | Crude pine nut oil | Example 1 | Example 2 |
|---|---|---|---|
| FFA as oleic acid | 1.04 | 0.06 | 0.03 |
| PV-man | 5.7 | 0 | 0 |
| C18:2C 5, 9 | 2.2 | 2.1 | 2.2 |
| C18:3C 5, 9, 12 | 15.9 | 15.4 | 15.6 |
| MUFA | 26.4 | 26.1 | 26.3 |
| PUFA | 66.2 | 65.8 | 65.7 |
| C16:0 | 4.5 | 4.5 | 4.4 |
| C16:1C | 0.2 | 0.2 | 0.2 |
| C17:0 | 0.1 | 0.1 | 0.1 |
| C18:0 | 2.1 | 2.1 | 2.1 |
| C18:1T | 0 | 0 | 0.1 |
| C18:1C | 24.9 | 24.7 | 24.8 |
| C18:2T | 0.1 | 0.2 | 0.1 |
| C18:2C | 45.6 | 45.6 | 45.2 |
| C18:3T | 0.1 | 0.1 | 0 |
| C18:3C | 0.2 | 0.2 | 0.2 |
| Total Trans | 0.2 | 0.3 | 0.2 |
| C20:0 | 0.4 | 0.4 | 0.5 |
| C20:3C | 1.3 | 1.3 | 1.5 |
| C20:1C | 1.3 | 1.2 | 1.3 |

-continued

|  | Crude pine nut oil | Example 1 | Example 2 |
|---|---|---|---|
| C20:2C | 0.8 | 0.8 | 0.8 |
| C22:0 | 0.1 | 0.1 |  |
| SAFA | 7.1 | 7.2 | 7.2 |
| Others | 0.3 | 0.9 | 0.9 |
| Y5¼" | 46 |  |  |
| R5¼" | 3.2 | 3.6 | 1.9 |

Example 4

The refined oils of Examples 1 and 2 were tested for their susceptibility to oxidation and were analysed for copper (Cu) and iron (Fe) content. The results were as follows:

| Analysis |  | Example 1 | Example 2 |
|---|---|---|---|
| Peroxide value (PV)* | (meqO2/kg) | 0.0 | 0.0 |
| PV 3 wk 40° C. air | (meqO2/kg) | 3.5 | 0.1 |
| PV 4 wk 40° C. air | (meqO2/kg) | 6.3 | 4.2 |
| PV 6 wk 40° C. air | (meqO2/kg) | 6.8 | 6.9 |
| PV 11 wk 7° C. N2 | (meqO2/kg) | 1.2 | 0.5 |
| Anisidine Value (AV)** |  | 9.2 | 6.9 |
| AV 3 wk 40° C. air |  | 9.2 | 6.9 |
| AV 4 wk 40° C. air |  | 9.3 | 7.6 |
| AV 6 wk 40° C. air |  | tbd | tbd |
| R 5¼ † |  | 3.6 | 1.9 |
| Cu †† | ppm | 0.00 | 0.00 |
| Fe †† | ppm | 0.14 | 0.13 |

* AOCS; Cd 8b-90; Peroxide value; 1997
** AOCS, Cd 18-90, p-Anisidine Value, 1997
† AOCS Cc 13e-92, Color, 2000
†† ISO 8294: 1999

Oil refined according to Example 2 in a two step bleaching process with antioxidant added prior to the first bleaching step shows surprisingly improved resistance to oxidation compared to the comparative example, Example 1, in which the same antioxidant is added at the end of the process. This is surprising since it could reasonably have been expected that the antioxidant would exhibit its optimum performance in the refined oil when added to the oil at the end of the process. Since the metal content of both of the oils is virtually identical, the difference in susceptibility to oxidation cannot be attributed to the effect of metal ions. Moreover, the colour of the refined oil is unexpectedly lower in Example 2 according to the invention than in the comparative example.

The invention claimed is:

1. Process for refining a triglyceride oil which comprises:
providing a triglyceride oil;
bleaching the oil in the presence of an added antioxidant in a first bleaching step;
bleaching the oil in a second bleaching step; and
deodorizing the bleached oil,
wherein the antioxidant comprises a rosemary extract.

2. Process as claimed in claim 1, wherein the oil is treated with alkali to reduce the acid content of the oil prior to bleaching.

3. Process as claimed in claim 1, wherein the oil is a polyunsaturated oil.

4. Process as claimed in claim 1, wherein the oil comprises pinolenic acid.

5. Process as claimed in claim 1, wherein the oil is pine nut oil.

6. Process as claimed in claim 1, wherein the oil has a colour R (51/4") of less than 2.5.

7. Process as claimed in claim 1, wherein the antioxidant further comprises one or more tocopherols.

8. Process as claimed in claim 7, wherein the weight ratio of rosemary extract to one or more tocopherols is in the range of from 3:1 to 1:1.

9. Process as claimed in claim 1, wherein the antioxidant is used at a level of from 0.1 to 1% by weight of the oil.

10. Process as claimed in claim 1, wherein the first and second bleaching steps are carried out in the presence of one or more bleaching earths.

11. Process as claimed in claim 1, wherein the first bleaching step is carried out in the presence of activated carbon.

12. Process as claimed in claim 1, wherein the second bleaching step is carried out in the absence of activated carbon.

13. Process as claimed in claim 1, wherein the oil is filtered between the first and second bleaching steps.

14. Process as claimed in claim 1, wherein the deodorized oil has a peroxide value after 3 weeks in air at 40.degree. C. of less than 3 meqO.sub.2/kg.

15. Process as claimed in claim 1, wherein further antioxidant is not added to the deodorized oil.

16. Method of increasing the efficacy of an antioxidant in a process for refining a triglyceride oil which comprises adding the antioxidant to the oil in the first stage of a multi-stage bleaching process, wherein the antioxidant comprises a rosemary extract.

17. Process for reducing the colour of a refined triglyceride oil which comprises: providing a triglyceride oil; bleaching the oil in the presence of an added antioxidant in a first bleaching step; bleaching the oil in a second bleaching step; and deodorizing the bleached oil, wherein the antioxidant comprises a rosemary extract.

18. A method of increasing the storage stability of a triglyceride oil which comprises: providing a triglyceride oil; bleaching the oil in the presence of an added antioxidant in a first bleaching step; bleaching the oil in a second bleaching step; and deodorizing the bleached oil, wherein the antioxidant comprises a rosemary extract.

19. The process of claim 1, wherein the oil is treated with citric acid prior to a bleaching step.

20. The process of claim 1, wherein the steps are carried out at atmospheric pressure.

* * * * *